United States Patent [19]
Lopez et al.

[11] Patent Number: 6,141,417
[45] Date of Patent: Oct. 31, 2000

[54] HOLDER FOR MOBILE TELEPHONE

[75] Inventors: Peter E. Lopez, The Colony; Morris Humphreys, Saginaw; Ari Leman, Euless, all of Tex.

[73] Assignee: Nokia Mobile Phones Limited, Espoo, Finland

[21] Appl. No.: 09/136,186

[22] Filed: Aug. 19, 1998

[51] Int. Cl.[7] ............................................ H04M 1/00
[52] U.S. Cl. .................................. 379/446; 379/455
[58] Field of Search ................................. 379/446, 454, 379/455, 449, 426; 224/930

[56] References Cited

U.S. PATENT DOCUMENTS

| | | | |
|---|---|---|---|
| 5,253,292 | 10/1993 | Fluder et al. | 379/446 |
| 5,988,577 | 11/1999 | Phillips et al. | 379/446 |

*Primary Examiner*—Jack Chiang
*Attorney, Agent, or Firm*—Brian T. Rivers

[57] ABSTRACT

A holder for a mobile telephone is disclosed. The holder has a securing mechanism that securely holds a mobile telephone within the holder and allows easy movement of the mobile telephone from and into a secure position within the holder. In an embodiment of the invention, the holder includes a cradle unit that has a securing mechanism including a securing pin flexibly formed on the top end of the cradle unit and a securing pocket formed on the bottom end of the cradle unit. A mobile telephone may be secured in the cradle by placing the bottom portion of the mobile telephone in the securing pocket and moving the mobile telephone into the cradle unit, allowing the securing pin to snap into a securing notch that is formed on the top portion of the mobile telephone. The cradle unit may be formed of a single piece body. The cradle unit may also be formed to encompass the mobile telephone to provide a better tactual grip than is provided by the body of the mobile telephone alone.

18 Claims, 5 Drawing Sheets

HOLDER FOR MOBILE TELEPHONE

FIELD OF THE INVENTION

This invention relates to mobile telephone holders and, more particularly, to a mobile telephone holder having a securing mechanism allowing easy movement of the mobile telephone from and into the holder, and easy use and handling of the mobile telephone while the mobile telephone is in the holder.

BACKGROUND OF THE INVENTION

The types and numbers of mobile telephones in use worldwide are rapidly increasing. Average mobile telephone size is decreasing, and the variety of physical configurations of mobile telephones is increasing. The types of physical configurations currently available include pocket-sized phones that may be shaped like a conventional mobile phone or that may be implemented in an increasingly popular folding or clamshell type configuration.

As mobile telephones become smaller, handling of a telephone by a user may become difficult in certain circumstances. For example, the small size of a device, such as a palm-sized folding or clamshell type telephone, may make it difficult for a user to carry if no pocket is available, or if the telephone is held loosely in a pocket where it can move about or fall out. Additionally, trying to locate and accessing the telephone to make or receive a call may be difficult if it is necessary to locate and remove the phone from a pocket that is larger than the phone.

Securing a small sized device, such as the palm-sized folding or clamshell type telephone in a conventional type mobile telephone holder located in an automobile or on a belt clip, for example, may alleviate the problem of locating the device, but it may still be difficult to remove the device from the mobile telephone holder for use. Also, in certain situations, once the mobile telephone is removed from the holder or belt, the small size of the mobile telephone may be a hindrance to quick access to the mobile telephone and the mobile telephone keypad.

SUMMARY OF THE INVENTION

The present invention provides a holder for a mobile telephone, where the holder has a securing mechanism that securely holds a mobile telephone within the holder and allows easy movement of the mobile telephone from and into a secure position within the holder. The holder may be removably mounted on an object, permitting the user to transport the mobile telephone if desired. The securing mechanism is light and simple in construction, and a minimum number of parts are needed for implementing the mechanism. The holder may be formed from a single piece of material. The holder may be constructed in such a way as to facilitate locating and accessing a small sized mobile telephone and also allow use of a mobile telephone while the mobile telephone is secured in the holder. The holder may also serve the function of providing a user with a better-defined tactual grip on the mobile telephone than is obtained by holding the mobile telephone alone in the user's hand.

In an embodiment of the invention, the holder includes a cradle unit that has a securing mechanism including a securing pin flexibly formed on its top end and a securing pocket formed on its bottom end. A mobile telephone may be secured in the cradle by placing the bottom portion of the mobile telephone in the securing pocket and moving the mobile telephone into the cradle, allowing the securing pin to snap into a securing notch that is formed on the top portion of the mobile telephone. The cradle unit may include side portions that aid in guiding the mobile telephone into the securing pocket and also aid in securing the mobile telephone when the phone is secured in the holder. The securing pin and securing pocket are formed to allow use of the keypad and display of a mobile telephone while the telephone is secured in the cradle unit.

The cradle unit also encloses the mobile telephone to provide a better tactual grip on the mobile telephone through the larger holding surface of the cradle. This facilitates quick access to and use of the mobile telephone. The cradle unit is configured so that the complete cradle may be formed from a single piece of material, such as plastic, minimizing the number of parts.

In the embodiment, the holder may also include a clip. The clip may be attached to the rear portion of the cradle unit and allow a user to attach the cradle to an object such as a belt or dashboard. When quick access to the mobile telephone is necessary, the mobile telephone and holder may be removed from the object that it is attached to, and the user may grip a complete assembly including the holder and the phone, and operate the phone having the benefit of the firm grip offered by the cradle unit.

BRIEF DESCRIPTION OF THE DRAWINGS

A more complete understanding of the present invention may be had by reference to the following detailed description when read in conjunction with the accompanying drawings wherein.

DETAILED DESCRIPTION OF THE INVENTION

Figure 1:
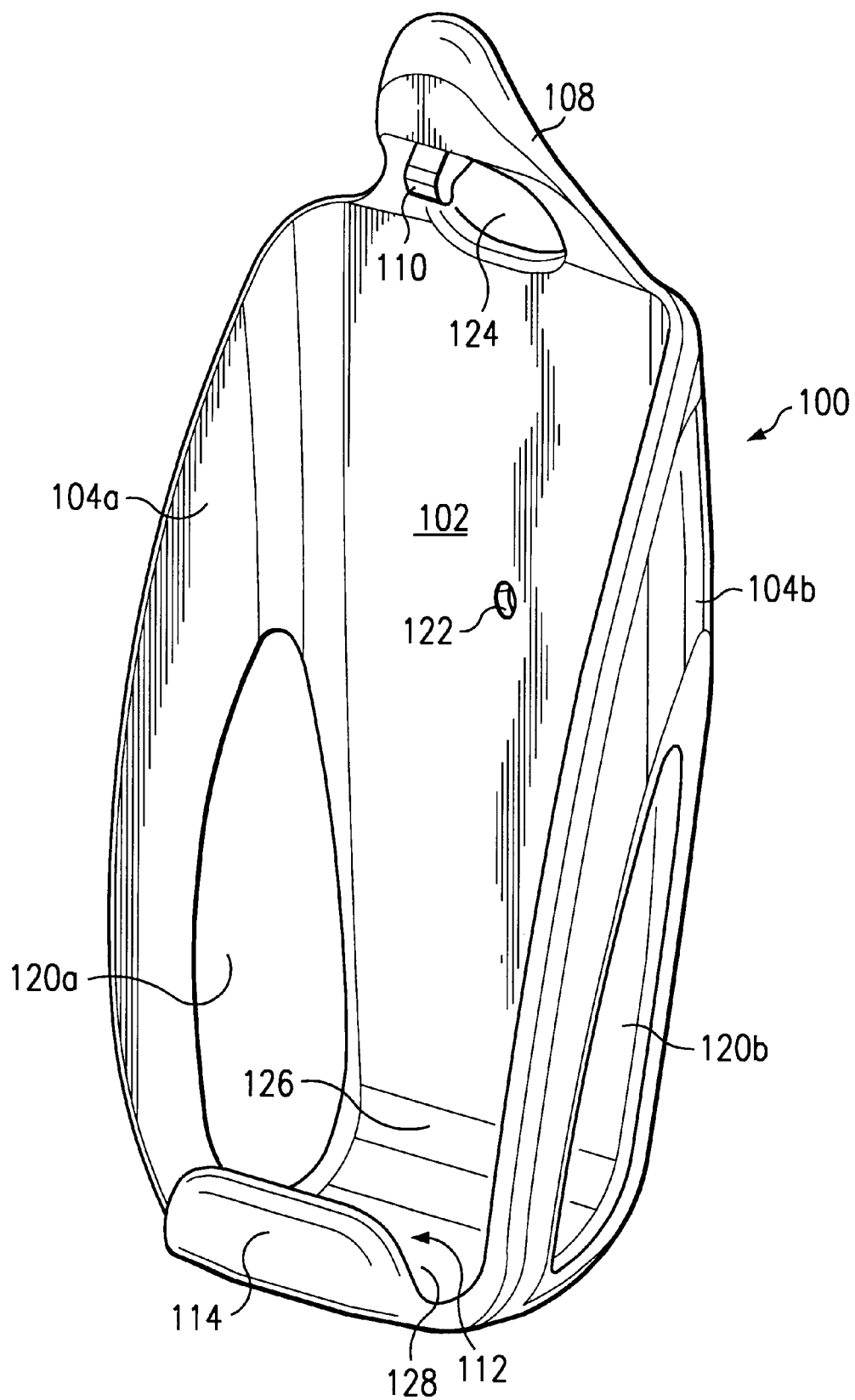
FIG. 1 is a right front perspective view of the cradle unit of a mobile telephone holder according to an embodiment of the invention.
Figure 2:
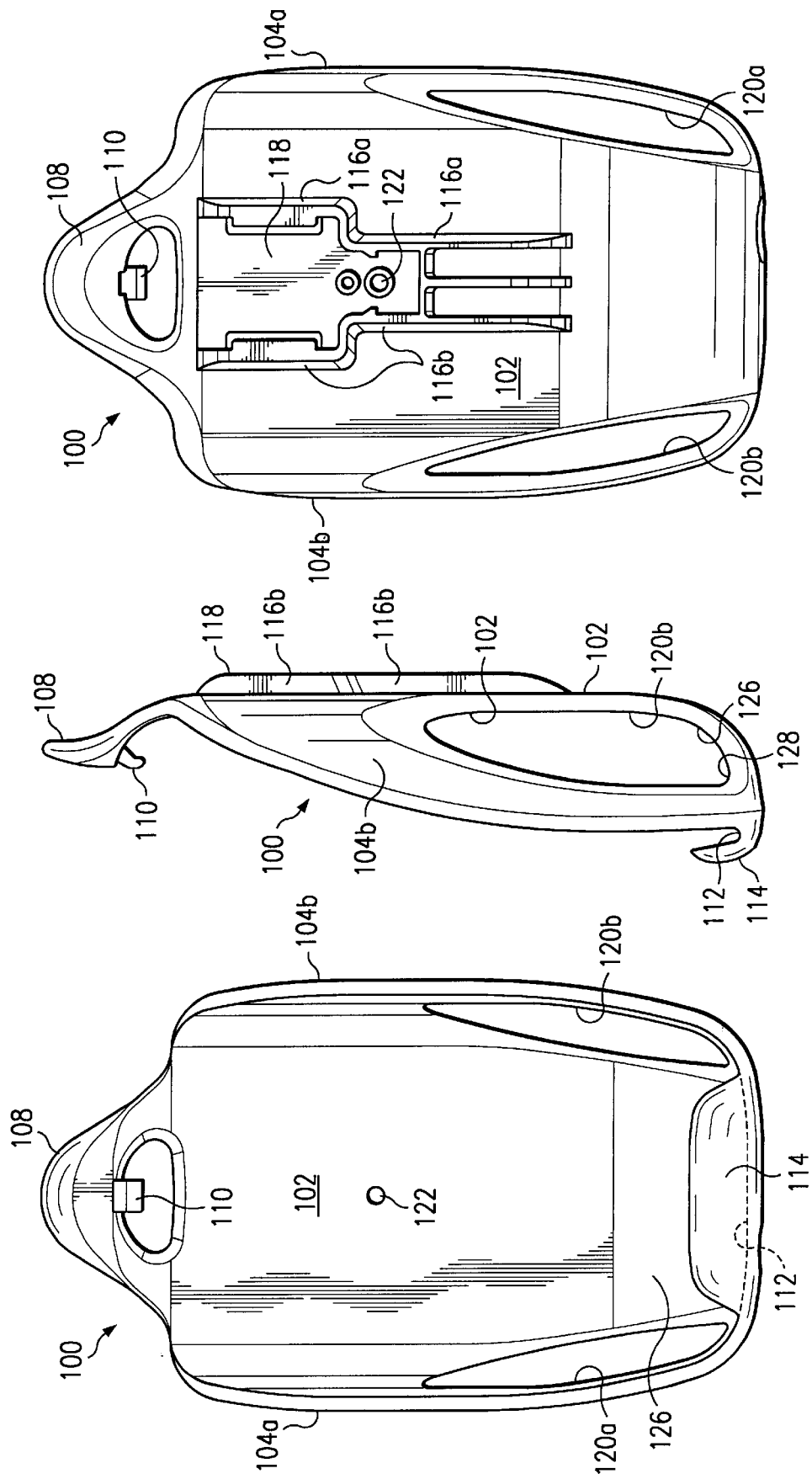
FIGS. 2A, 2B and 2C are front, right side and rear views, respectively, of the cradle unit of a mobile telephone holder according to an embodiment of the invention.

Referring now to FIGS. 1, 2A, 2B and 2C, therein are a right front perspective view, a front view, a right side view and a rear view, respectively, of a cradle unit of a mobile telephone holder according to an embodiment of the invention. Cradle unit 100 comprises right side 104a, left side 104b, back portion 102, extension 108, securing pin 110 and front wall 114. A securing pocket 112 is formed from the lower portions of right and left sides, 104a and 104b, front wall 114, bottom surface 128, and a rear wall 126 comprised of the lower portion of back portion 102. The edges of right and left sides 104a and 104b, bottom surface 128, and back portion 102 form openings 120a and 120b. Back portion 102 may include mounting hole 122. Extension 108 may include opening 124. A mounting bracket 118, including right and left ribs 116a and 116b, respectively, may be mounted on the rear of back portion 102. Cradle unit 100 may be formed from a single piece of material, such as, for example, plastic.

Figure 3:
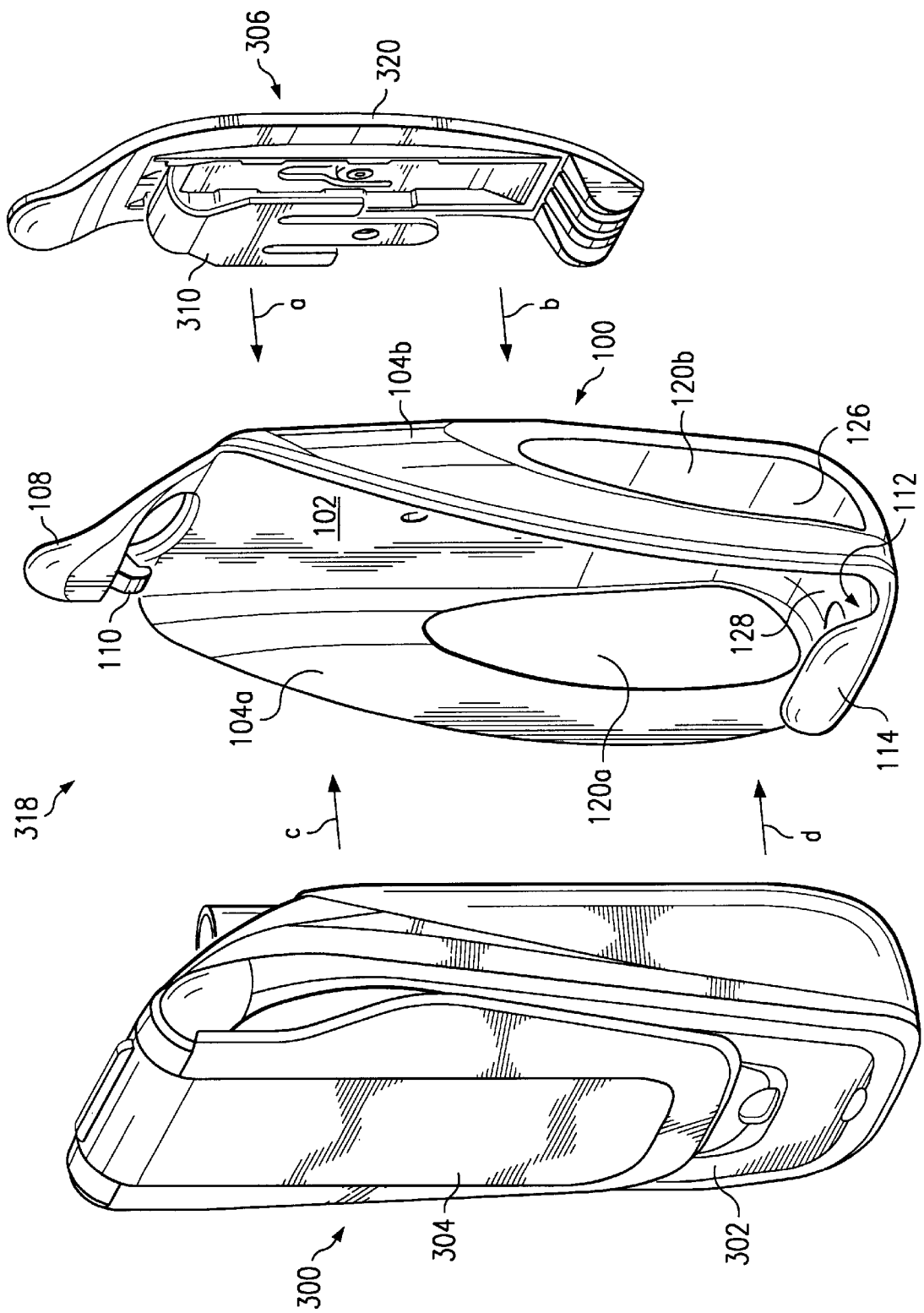
FIG. 3 is an exploded view of a mobile telephone and holder assembly according to an embodiment of the invention.

Referring now to FIG. 3, therein is an exploded view of a mobile telephone and holder assembly according to an embodiment of the invention. Mobile telephone 300 comprises a main body 302 and a flip unit 304. Holder 318 comprises clip 306 and cradle unit 100. Clip 306 comprises main portion 320 and spring 310 and may be mounted on the rear of back portion 102, as shown by arrows a and b, by sliding spring 310 into mounting bracket 118. Clip 306 may be secured in mounting bracket 118 by, for example, use of a rivet, bolt or other fastening device inserted through hole 122. Mobile telephone 300 is inserted into cradle unit 100, as shown by arrows c and d. Holder 318 may be attached to an object, such as a belt or dashboard, by using clip 306 for carrying or holding the mobile telephone 300.

Figure 4A:
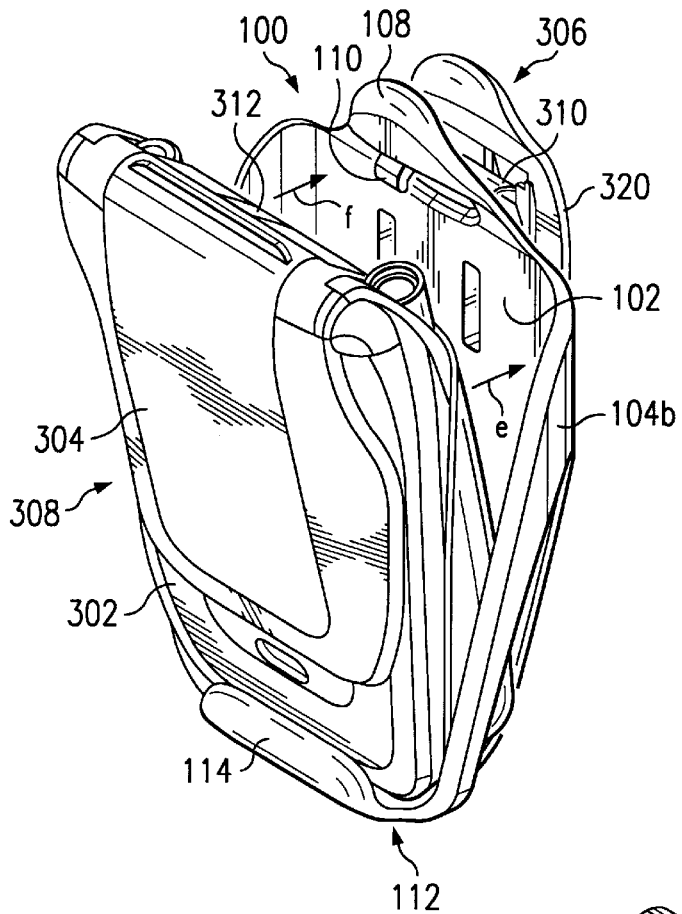
FIGS. 4A, 4B, 4C and 4D are a first right front perspective view, a second right front perspective view, a right side view, and a third right front perspective view, respectively, of a mobile telephone inserted into a mobile telephone holder according to an embodiment of the invention.
Figure 4B:
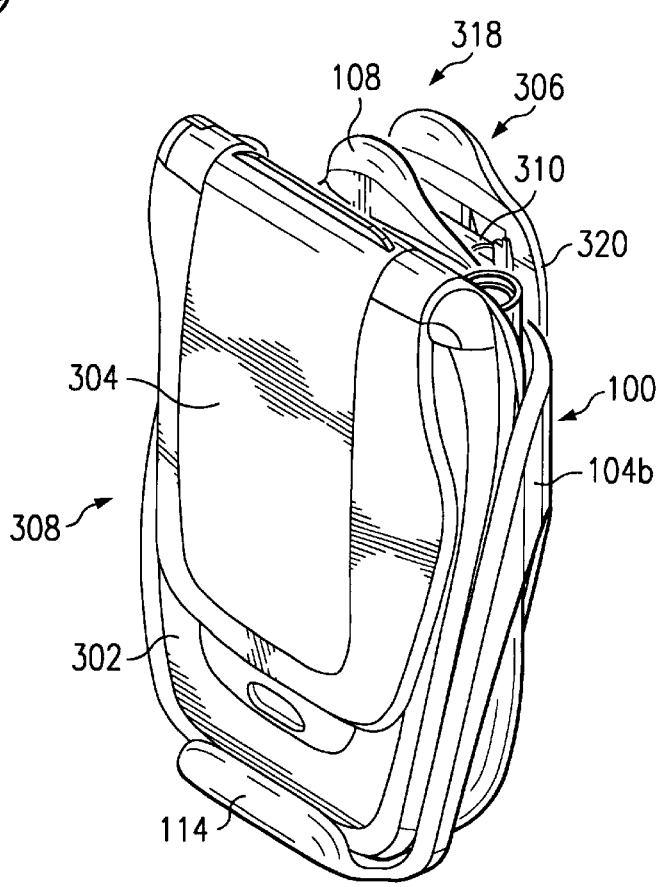
Figure 4C:
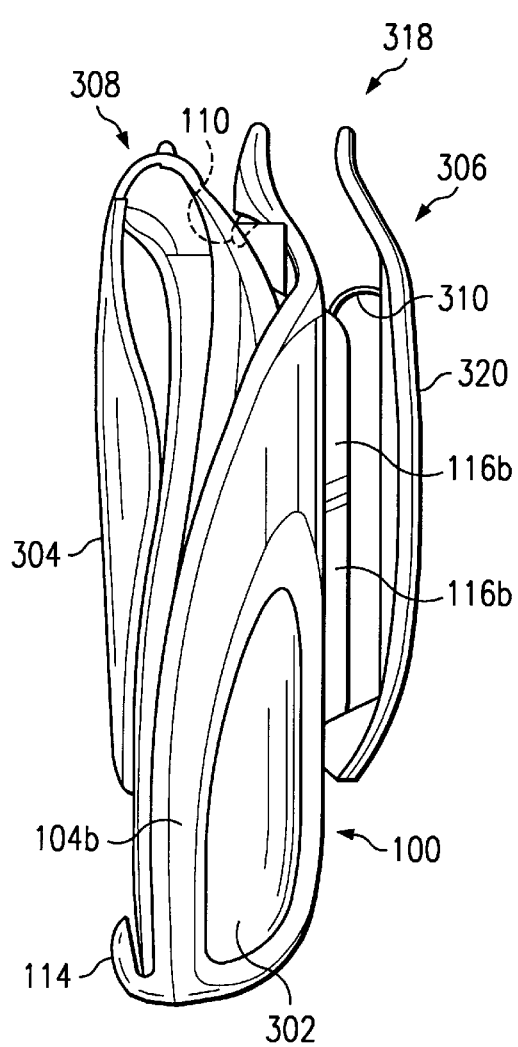

Referring now to FIGS. 4A, 4B, 4C and 4D, therein are a first right front perspective view, a second front right perspective view, a right side view, and a third front right perspective view of a mobile telephone being inserted into a mobile telephone holder according to an embodiment of the invention. Mobile telephone 300 may be inserted into cradle unit 100 by placing main body 302 of mobile telephone 300 into securing pocket 112 of cradle unit 100, as shown in FIG. 4A. Mobile telephone 300 may then be moved into cradle unit 100 by moving mobile telephone 300 in the direction of arrows e and f. Securing pin 110 is mounted on extension 108 so that securing pin 110 flexibly engages and snaps into securing notch 312 on top rear of main body 302 of mobile telephone 300, as mobile telephone 300 comes against back portion 102 of cradle unit 100. In the embodiment of the invention, the formation of opening 124 in extension 108 removes material from extension 108, increasing the flexibility of extension 108. Also, openings 120a and 120b receive respective corners of main body 302 of mobile telephone 300, allowing a tight fit of mobile telephone 300 in cradle unit 100 without the need to require complicated molding techniques, if cradle unit 100 is formed from a single piece of material. Cradle unit 100 should be formed of a material flexible and resilient enough to allow extension 108 and securing pin 110 to flex in the backward direction and return to its original position in order to perform the securing function. FIGS. 4B and 4C show mobile telephone 300 when fully inserted into holder 318. Back portion 102, sides 104a and 104b, securing pocket 112 and securing pin 110 comprise the securing mechanism that holds mobile telephone 300 securely in cradle unit 100. Holder 318 and mobile telephone 300 form a single unit that is easy to handle and that may be held in one hand. Cradle unit 100 provides a better tactual grip with which to hold mobile telephone 300 than is provided by body 302 of mobile telephone 300 alone. Main portion 320 of clip 306 is formed not to interfere with the gripping of holder 318 and may be formed to give added improvement in tactual grip. The whole unit formed by mobile telephone 300 and holder 318 may be removed from a belt, for example, by grasping the unit with a single hand.

Figure 4D:
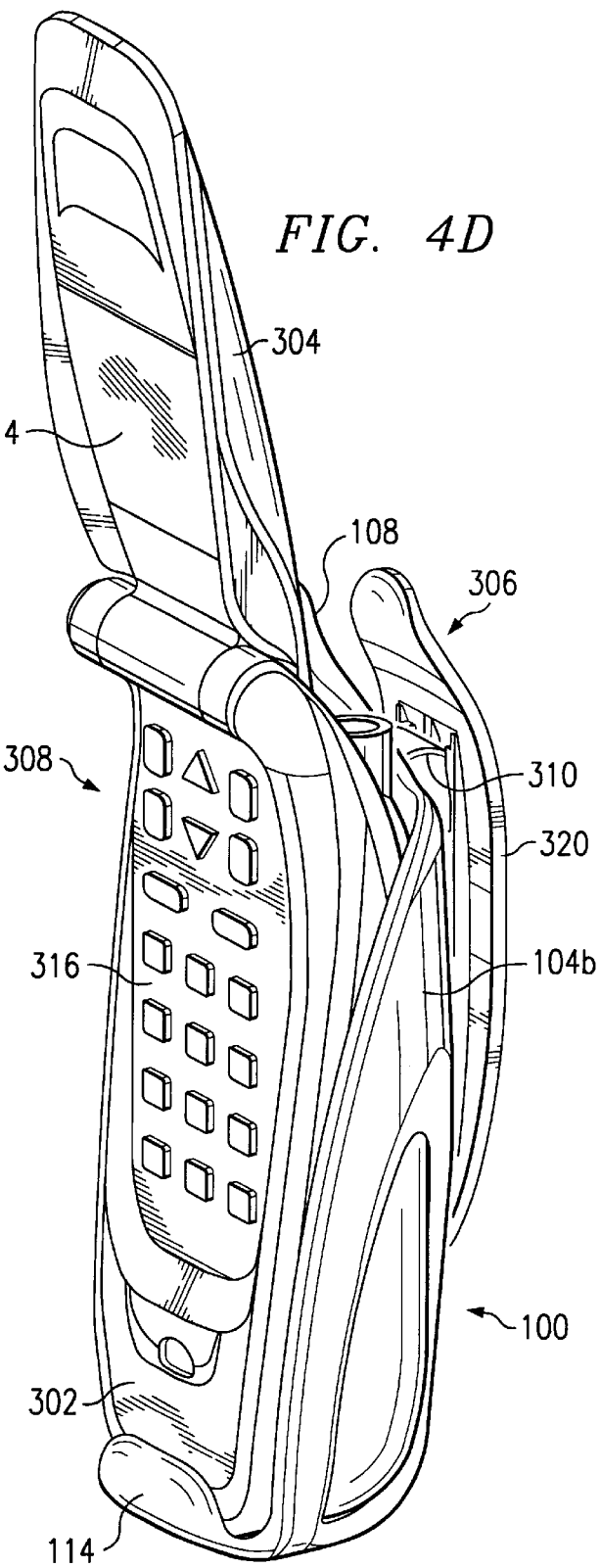

Cradle unit 100 is configured to allow use of mobile telephone 300 while in holder 318. FIG. 4D shows how flip unit 304 of mobile telephone 300 may be opened while in holder 318 to allow access to and use of keyboard 316 without the need to remove mobile telephone 300 from holder 318. The complete assembly may then be operated while held in one hand.

In alternative embodiments, a smaller clip may replace clip 306, or holder 318 may be mounted on an object using alternative mounting mechanisms, such as a tab mounted on the rear side of back portion 102 of cradle unit 100 that snaps into an assembly mounted on the object.

Although described in the context of particular embodiments, it will be realized that a number of modifications to these teachings may occur to one skilled in the art. Thus, while the invention has been particularly shown and described with respect to specific embodiments thereof, it will be understood by those skilled in the art that changes in form and shape may be made therein without departing from the spirit and the scope of the invention.

What is claimed is:

1. A holder for holding a mobile communications device, said holder comprising:
   a cradle unit including:
      a back portion, said back portion having a first end and a second end;
      a pocket, said pocket mounted on said first end of said back portion substantially perpendicular to said back portion, said pocket having a front wall, a rear wall and a first and a second opening, said pocket for receiving a first end of the mobile communication device, wherein said first and said second openings receive a first and a second corner, respectively, of the mobile communication device, allowing said first and second corner of the mobile communication device to extend through said pocket, when the mobile communication device is inserted in said pocket of said cradle unit; and
      a pin, said pin mounted on said second end of said back portion, said pin for flexibly allowing insertion of the mobile communication device into said cradle unit, coupling with said second end of the mobile communication device and securing the mobile communication device in said cradle unit.

2. The holder of claim 1, wherein said cradle unit is formed of a one-piece body.

3. The holder of claim 2, wherein said back portion comprises a first and a second side, and said first and said second side of said back portion and said front wall of said pocket define an open front of said cradle unit, allowing operation of the mobile communication device while secured in the cradle unit.

4. The holder of claim 3, wherein said cradle unit forms a wraparound holder for the grasping of the mobile communication device during use.

5. The holder of claim 4, wherein said cradle unit is formed of a one-piece body.

6. The holder of claim 5, wherein said back portion further has a rear face, and said holder further comprises a clip mounted on said rear face of said back portion.

7. The holder of claim 4, wherein said cradle unit is formed to allow opening of a flip-type cover on the mobile communication device while secured in the cradle unit.

8. A holder for holding a mobile communication device, said holder comprising:
   a cradle unit including:
      a back portion, said back portion having a first and a second end and a surface;
      a pocket, said pocket mounted on said second end of said back portion, said pocket having a bottom surface extending outward from and substantially perpendicular to said surface, and a first and second opening, said pocket for receiving a first end of the mobile communication device, wherein said first and said second openings receive a first and a second corner, respectively, of the mobile communication device, allowing said first and second corner of the mobile communication device to extend through said pocket when the mobile communication device is inserted in said cradle unit;
      an extension, said extension having a first and a second end, wherein said second end of said extension is mounted on said first end of said back portion and angled toward said surface of said back portion; and a pin, said pin mounted on said first end of said extension and extending toward said pocket, wherein said pin allows insertion of the mobile communication device into said cradle unit, couples with a second end of the mobile communication device, and secures the mobile communication device in said cradle unit.

9. The holder of claim 8, wherein said cradle unit is formed of a one-piece body.

10. The holder of claim 8, wherein said back portion has a first and a second edge, and said bottom portion of said pocket has a first and a second edge, and wherein said cradle unit further comprises a first side and a second side, each having a first and second end and an edge, said first end of said first side attached to said first edge of said back portion and said second end of said first side attached to said first edge of said bottom portion of said pocket, and said first end of said second side attached to said second edge of said back portion, and said second end of said second side attached to said second edge of said bottom portion of said pocket, wherein said edge of said first side, first edge of said bottom portion of said pocket and said first edge of said back portion form said first opening, and wherein said edge of said second side, second edge of said bottom portion of said pocket and said second edge of said back portion form said second opening.

11. The holder of claim 10, wherein said cradle unit is formed of a one-piece body.

12. The holder of claim 8, wherein said cradle unit forms a wraparound holder for grasping the mobile communication device during use.

13. The holder of claim 8, wherein said cradle unit is formed to allow opening of a flip-type cover on the mobile communication device while secured in the cradle unit.

14. The holder of claim 8, wherein said surface of said back portion comprises a first surface, and said back portion further comprises a second surface, said holder further comprising a clip mounted on said second surface of said back portion.

15. A mobile telephone and holder assembly comprising:

a mobile telephone having a keypad and a flip-type cover, said flip-type cover movable between an open position and a closed position, wherein said keypad is accessible for use when said flip-type cover is in said open position and access to said keypad is blocked when said flip-type cover is in said closed position; and a cradle unit having a pocket and a first and second opening for receiving said mobile telephone, wherein said first and second openings receive a first and second corner of said mobile telephone, allowing said first and said second corner of said mobile telephone to extend through said pocket, and said pocket is formed to allow movement of said flip-type cover between said first and second positions when said mobile telephone is inserted in said pocket.

16. The mobile telephone and holder assembly of claim 15, wherein said cradle unit forms a wraparound holder for grasping said mobile telephone and allows holding and operation of said mobile telephone while said mobile telephone is secured in said cradle unit.

17. The mobile telephone and holder assembly of claim 15, wherein said mobile telephone further comprises a first end and a second end, wherein said flip-type cover is disposed on said second end of said mobile telephone, and wherein said cradle unit comprises a first end, said first end of said cradle unit for receiving said first end of said mobile telephone when said mobile telephone is secured in said cradle.

18. The mobile telephone and holder assembly of claim 17, further comprising a clip for securing said cradle unit to an object.

* * * * *